Jan. 27, 1970   J. L. VAWTER   3,491,691
SHELL CASING AND ITS METHOD OF MANUFACTURE
Filed March 7, 1968
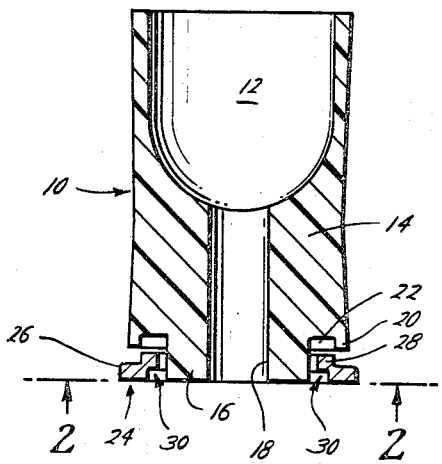
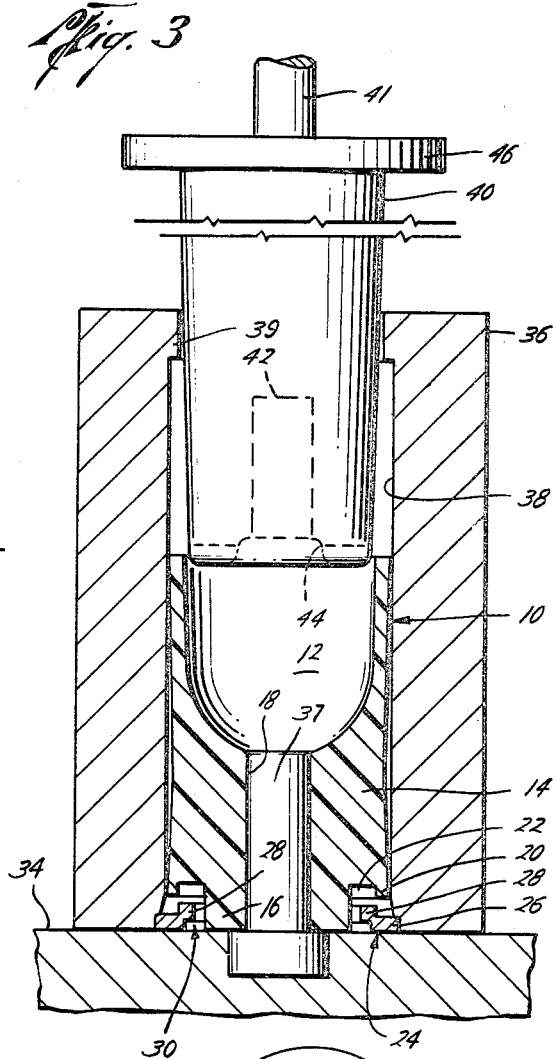
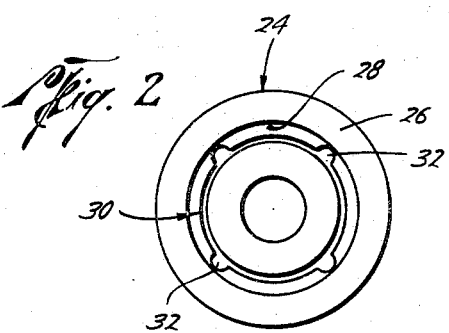
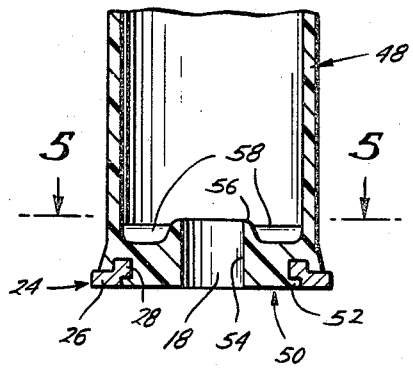
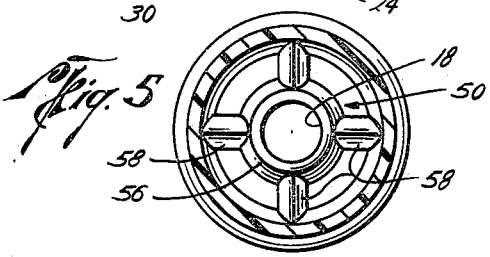
James L. Vawter
INVENTOR.
BY James F. Weiler
Paul L. DeVerter II
Dudley R. Dobie, Jr.
Henry W. Hope
ATTORNEYS United States Patent Office 3,491,691
Patented Jan. 27, 1970

3,491,691
SHELL CASING AND ITS METHOD
OF MANUFACTURE
James L. Vawter, El Campo, Tex., assignor to Vawter
Ammunition, Inc., El Campo, Tex., a corporation of
Texas
Filed Mar. 7, 1968, Ser. No. 711,371
Int. Cl. F42b 5/30
U.S. Cl. 102—43                                    11 Claims

ABSTRACT OF THE DISCLOSURE

The present invention relates to shell casings comprised primarily of oriented plastics, but having a metal rim insert, and to a method of making such casings. Compression is used to form the casing and secure it to the metal rim, and in so doing, to orient the plastic in the base as well as the sidewalls of the casing. The opening for the primer cap is also formed of the oriented plastic in the base.

BACKGROUND OF THE INVENTION

The present invention relates to shell casings comprised of a tubular body portion of plastic in a highly oriented state and a rim at the base of the casing comprised of metal and being fixedly attached to the plastic body. The present invention is also directed to a method of making such a casing. An important aspect of the present invention is the formation of such a casing having the plastic portion of its base, and particularly the area around the opening for the primer cap and for connecting the ring in a highly oriented state.

Perhaps the most widely used type of shotshell casing throughout the history of their manufacture are those comprised primarily of heavy paper which has been impregnated with a wax. The base portion of such casings consist of a metal cap containing the primer. This type of construction, although widely used, suffers from certain disadvatnages. Such shells often require complex and expensive processes for their manufacture and the paper construction is more susceptible to damage from moisture. Such paper casings are often torn apart when subjected to the extreme pressures and temperatures that are present when firing a shotgun. The torn paper can result in the jamming of the gun, as well as subject the gun to the exposure of certain burning gases which are given off when the shell is fired. This may result in possible damage to the gun, as well as to the shooter. Furthermore, such casings are not readily reloadable which practice has today become increasingly popular.

Today, the use of plastic in the manufacture of shotshell casings is becoming quite widely employed. Such a casing and the manufacture thereof is disclosed in application Ser. No. 555,890, filed June 7, 1966 and entitled Plastic Shellcase. A number of patents have issued on plastic shellcases or the methods of their manufacture, such as U.S. Patent Nos. 3,009,958, 3,170,401, 3,164,090, 3,125,924 and 3,171,350.

Various approaches have been adopted in the application of plastics to the manufacture of such shell casings. One method is to mold the plastics into the casing. This method suffers from the disadvantage, however, of having the casings fail when subjected to the previously mentioned high pressures and temperatures. To achieve the necessary strength, manufacturers have turned to the process of compressing the plastic into the casing. This results in the formation of a casing having the tubular portion composed of plastic in the desired highly oriented state, and accordingly, with the desired strength, but with a base portion in an unoriented state. The use of a casing having a relatively weak base quite often results in the improper operation of the ejection mechanism which operates on the rim of the casing. This can result in the jamming of the gun as well as preventing the ejection of the spent casing. The eject mechanism can also damage the rim of the shell, thus preventing its being reloaded for future use. Furthermore, a soft plastic base often does not function as adequate securing means for the primer cap or the metal rim, especially after being reloaded and reused several times. Accordingly, the effective life of the casing is decreased. To overcome these disadvantages, manufacturers have turned to the use of a metal rim to form the rim portion of the casing and the opening for the primer cap.

SUMMARY OF THE INVENTION

The present invention overcomes the above-mentioned disadvantages by providing a casing made up essentially of a plastic tubular element having not only the plastic in the sidewalls in a highly oriented state, but also having the base material in such a highly oriented state. A metal rim is attached to the base portion of the casing and is secured thereto by the highly oriented plastic making up the base. The present invention also provides a casing having the opening for the primer cap comprised of highly oriented plastic, whereby it is unnecessary to extend the metal rim or cap into this area of the base. Sufficient strength is provided by the plastic in this area.

The method of forming the shell casing of the present invention is carried out by the formation of a slug of unoriented plastic material having a specific configuration, whereby the plastics will move in a desired manner when compressed into the shape of the shotshell casing. This movement will result in the orientation of the plastic throughout most of the casing. The slug has a depending plug, about which a metal rim is placed. The rim has a recess in its lowermost side. The slug also has a preformed opening for the primer in its base, the opening extending through the plug portion. The method utilizes a mold cavity into which the plastic slug and metal rim are placed. Both the slug and the cavity are then heated to a predetermined temperature and the male die member is forced into the die cavity, whereby the casing is formed. A pin is used in the mold to retain the primer opening at a constant size.

Due to the particular configuration of the slug and of the metal rim, a movement of the plastic within the base will take place which will result in the orientation of the plastic making up most of the base. The resulting product will be a shell casing having a metal rim but primarily composed of plastic which has increased strength in the critical base area due to the orientation of the material making up this area. This will enable the casing not only to provide greater strength in receiving and retaining the primer cap and metal rim, but will also aid the casing in withstanding the extreme pressures and temperatures to which it will be subjected when fired.

It is, therefore, an object of the present invention to provide an improved shell casing made up of plastic in a highly oriented state and with a metal rim.

A further object is to provide such a casing having a metal rim attached to the casing in a secure manner by plastic integrally formed with the casing and having increased strength due to its highly oriented state.

A still further object of the present invention is to form such a casing having increased strength in the primer area, whereby the plastic base itself will be sufficient for the retaining of the primer cap during repeated use and reloading thereof.

An additional object of the present invention is to provide a plastic casing having a metal rim with increased strength in the base area, whereby the rim and primer will be retained in a more secure manner and for a longer period of time, and which casing can better withstand the extreme pressures and temperatures to which it will be subjected.

Still another object of the present invention is to provide a method for the manufacture of such a shell casing.

Other and further objects, features and advantages will be apparent from the following description of a presently preferred embodiment of the invention, given for the purpose of disclosure, when taken in conjunction with the accompanying drawings.

BRIEF DESCRIPTIONS OF THE DRAWINGS

In the accompanying drawings, like character references designate like parts throughout the several views, which are as follows:

FIGURE 1 is an elevational view, in section, of the unoriented slug of plastic and the metal rim, FIGURE 2 is a plan view of the slug and metal rim taken along section lines 2—2 of FIGURE 1, FIGURE 3 is an elevational view, in section, of the slug and rim positioned within the compression means, FIGURE 4 is a partial elevational view, in section, of a formed shotshell casing made in accordance with the present invention, and FIGURE 5 is a plan view of the interior base portion of the formed casing and taken along section lines 5—5 of FIGURE 4.

BRIEF DESCRIPTION OF A PREFERRED EMBODIMENT

The first step in forming the shell casing which is the subject of the present invention is to form the slug in the general configuration shown in FIGURE 1 of the drawing. The material that may be used in the formation of this slug may be a wide variety of crystalline plastic materials such as high density polyethylene on polypropylene with a heavy molecular weight that are suitable for orientation, and the like polymer and/or polymers of these materials. Two particular materials that have been used with satisfactory results are high density polyethylenes one of which is marketed by Phillips Petroleum Co. under the name of Marlex M 7000 and the second is manufactured by Hercules Powder Co. under the name Hifax 1800.

The slug 10 is formed by any well known means, such as molding. The slug 10 is comprised of an upper cavity portion 12, a body portion 14 and a plug 16. A passageway or opening 18 extends through the plug and the body portion as shown in FIGURE 1. A depending flange 20 is located about the lowermost peripheral edge of the body portion 14 and defines an annular recess 22.

Turning now to the rim and referring also to FIGURE 2, the rim is an annular ring or insert generally indicated by the numeral 24. It has a first flange portion 26 which extends outwardly and which will ultimately form the rim of the casing. An inwardly extending flange 28 forms a recess 30 which will be filled with plastic to provide means for securing the rim to the casing in cooperation with the flange 28. The flange 28 has located therein a plurality of notches 32. Although this rim insert is described in the preferred embodiment disclosed herein as being comprised of metal, it is to be understood that it may be made up of any suitable substance such as pre-hardened plastic.

The basic apparatus needed to form the shell casing is shown in FIGURE 3 and comprises essentially a stationary surface 34 upon which the female die member 36 is placed and secured by any conventional means. A pin 37 is also attached to the surface 34 and functions to center the slug and rim, as well as to preserve the dimensions of the primer opening 18. The female die member 36 has the appropriate cavity 38 which is formed in the shape desired for the casing. The cavity 38 has an upper peripheral lip 39. A male die member 40 is utilized which has an opening 42 (shown in dotted lines in FIGURE 3) to receive the pin 38 during the compression step. The male die member also has recesses 44 in its leading end which are once again shown in dotted lines on FIGURES 3. These recesses will form the inside of the base into the proper configuration, as will be discussed below. It is, of course, understood that the male die member is connected to suitable driving means such as a hydraulic cylinder by the shaft 41.

In forming the casing, the metal rim 24 is placed about the depending plug portion 16 of an unoriented slug 10 and this loose assembly is placed about the pin 38 in the compression apparatus. The female die member is then secured to the surface 34 so that the cavity receives the slug and rim. Prior to the start of the compression, the die apparatus and plastic slug are heated to a predetermined temperature which is generally near or below the crystalline melt point of the plastic making up the slug. For the polyethylenes mentioned above, this temperature is 256° F. for Marlex M 7000 and 273° F. for Hifax 1800. A wide variety of temperatures may be employed in this operation, however, but the preferable temperature range is near or below the crystalline melt point.

The male die member 40 is then introduced into the female die cavity 38. The peripheral flange 39 at the mouth of the female cavity 38 will act as a guide for the male die 40 and will also mate with the upper portions of the die member 40 to contain the plastic within the mold as it is compressed upwardly around the sides of the male die member. As the male die member is lowered further into the die cavity 38, the leading end will be received in the recess 12 formed in the slug 10. This recess will also act to guide the male member 40. As the male member 40 nears the bottom of the cavity 12, the actual compression will start and the pin 37 will enter the opening 42 for further guidance of this male die 40. As will be readily understood by one skilled in this art, the compression step will continue until the male die 40 reaches the end of its stroke. This may be determined by the length of stroke of the compression cylinder, or for example, by the shoulders 46 on the male die 40 mating with the top of the female die member 36.

The final product is partially shown in FIGURE 4 and comprises a generally cylindrically shaped member made up of sidewalls 48 and a base portion generally indicated by the numeral 50. The base portion is further comprised of an outer end portion, a part 52 of which extends into the recess 30 of the rim. A portion 54 defines the opening 18 which will receive the primer cap (not shown). An upstanding annular flange 56 is formed about the opening 18 on the interior of the shell as are radially extending upstanding ribs 58.

As the compression step takes place, one can readily see that the plastic material making up the sidewalls of the plug that form the recess 12 will tend to flow upwardly as the male member 40 moves further into the female die cavity 38. In addition, at least some of the material from the bottom portion 14 of the plug must also flow upwardly. It is this flowing action which orients the sidewalls of the shotshell casing, thus giving it the needed strength to withstand the extreme pressures and temperatures produced by the firing of the shell.

In the formation of the base portion 50, the depending flange 20 of the slug will be received about the outermost edge of the flange 28 of the metal rim insert 24. Plastic from the depending plug 16 will begin to flow outwardly and be received within the recess 30. Some of the plastic will be forced into the notches 32 of the metal insert 26, thereby preventing rotation of the insert after it is attached to the finished casing. Additional plastic will flow around the inwardly extending flange 28 of the rim insert 24 to completely fill the recess 30. It is this flowing movement about the inwardly extending flange 28 and into the recess 30 which brings about the added orientation to the base, thereby increasing its strength a significant amount. For additional strength, the ribs 58 and rim 56 are formed on the interior surface of the base.

As is seen, therefore, where most compression forming of such casings result in a casing having an oriented tubular sidewall portion and an unoriented base, the present invention provides for the flowing of the plastic material that makes up the base, whereby it is oriented to a relatively high degree. In this manner, additional strength is given to the base, which added strength will aid in the retaining to the casing of the metal rim in a secure manner, as well as the retaining of the primer cap within the primer opening 18. As will be readily understood, this will result in a longer life for the casing, thus increasing the number of times that it may be reloaded for reuse. While a substantial portion of the pressures exerted by the firing of the completed shell is borne by the upstanding ribs 58 and rim 56 as in prior art casings, it is the oriented portion of the plastic base which will retain the rim. Ejection mechanisms of a shotgun, in acting upon the rim, will exert a substantial force on the rim to throw the spent shell from the gun. As can be readily imagined, this force can easily tear the rim from the casing itself. The plastic filling the notches 32 on the rim insert is also of the oriented plastic to insure its longer life. By the present invention, the oriented plastic will securely retain the rim for a much longer period of time, thus resulting in simplified rim inserts that may be used, as well as in a simplified assembly technique required.

It is also an advantage of this invention that at least a portion of the base area 54 forming the primer opening 18 is also oriented by the flowing of the plastic generally around the inwardly extending flange 28 and into the recess 30. This will result in the maintaining, with sufficient force, of the primer cap within the primer opening 18 for additional reloading and usage. In practice, it has been observed that the force retaining the primer cap in the primer opening 18 is actually greater after the firing and reloading of the shell than prior to the firing of the shell. This increased "tightness" between the cap and the plastic making up the opening 18 is noticed through at least the fourth reloading, and adequate tightness is present for a number of times thereafter. It is believed that this possible "shrinkage" around the primer cap is an indication of orientation of the base, in that the heat exerted by the firing of the shell allows the release of some of the stress imposed in the base when it was oriented, thus, allowing it to "shrink."

Accordingly, as one can readily see, the objectives set forth at the outset are achieved. An economical casing has been formed which has a metal rim but is composed primarily of a plastic material, a greater portion of which is in a highly oriented state giving increased strength to the casing. The metal casing rim is attached by means of this highly oriented plastic, whereby it will be retained in a more secure manner for a greater length of time. This is also true of the plastic surrounding the primer area. Due to the oriented state of plastic within the base portion, this base portion is more capable of holding its desired configuration and retaining the primer opening at a constant size. As a result of these improvements, a casing has been presented which has increased life and which will lend itself to additional reloading and reuse.

What is claimed is:

1. A tubular element for use as a shell casing comprising,
   a generally cylindrically shaped plastic member including,
   (i) a base,
   (ii) sidewalls upstanding from the base, both the base and the sidewalls being of highly oriented plastic,
   (iii) an opening in the base for receiving a primer cap,
   a metal rim permanently attached to the base which rim includes,
   an inwardly extending, annular flange on the metal rim, the oriented plastic in said base extending around and substantially surrounding the flange to permanently secure the metal rim thereon, and
   an outer peripheral flange extending outwardly from the base and beyond the sidewalls and forming the shell casing rim.

2. The invention of claim 1, wherein, said opening is defined by the plastic base, the metal rim being spaced from said opening.

3. The invention of claim 1 wherein, the metal rim is spaced from said opening whereby the opening is defined by the base portion.

4. The invention of claim 2 wherein,
   the metal rim is further defined as having the general configuration of a ring, and including,
   a circular recess on the side of the ring opposite said sidewalls, a substantial thickness of said plastic base extending into said recess, thereby partially defining the plastic material surrounding the inwardly extending flange.

5. A tubular element for use as a shell casing comprising,
   a generally cylindrical plastic member open at one end and including,
   a base portion substantially closing the other end of the cylindrical member,
   an opening in the base portion for receiving a primer cap,
   an annular recess in the base portion concentric with said opening,
   a metal rim fixedly attached to the end of the base portion opposite said open end of the cylinder, the rim including,
   (i) a first annular flange received within the recess,
   (ii) a second annular flange extending outwardly from the base portion and forming the shell casing rim, and
   (iii) a recess on the side of the rim opposite the open end of said cylinder, a part of said base portion extending into and filling said recess and providing the means for the attachment of the rim,
   a first annular portion substantially enclosed within the base portion, and
   an annular flange extending out of the base portion and forming the shell casing rim,
   the enclosure of said first rim portion by the base portion being further defined as including,
   a substantial thickness of the base portion extending below the first annular portion of the rim on the side opposite the open end of the plastic member,
   the plastic forming said cylindrical member and base portion being in a highly oriented state.

6. The invention of claim 5 wherein the rim is of sufficient strength to resist the pressure during the powering of the shell without significant distortion thereof, whereby it will function to prevent any significant expansion of the base portion or primer opening.

7. A method of forming a tubular element for use as a shell casing comprising,
   forming a slug of unoriented plastic having a body, a plug depending a predetermined distance from the body, and an opening extending through the body and plug,
   placing an annular metal rim having an annular first portion with a first outside diameter and an outwardly extending flange with a second outside diameter greater than said first outside diameter on one side of the first portion about the plug so that said one side is away from the body of the slug,
   forming from the slug body a highly oriented generally cylindrical plastic member having a base portion by the compression of the slug, forcing the plastic in the base portion around the first rim portion to essentially surround said first rim portion, maintaining the outside diameter of the cylindrical member greater than said first outside diameter, but less than said second outside diameter, whereby the sidewall of the cylindrical member is comprised of plastic extending to said rim and the outwardly extending flange comprises said rim, maintaining the size of the opening essentially constant during the compression of the slug.

8. The invention of claim 9 and including the step of:

heating the slug to a temperature near but below the crystalline melt point of the plastic making up the slug prior to the step of forming the highly oriented member.

9. The invention of claim 7 wherein said forcing step is further defined as, forcing a substantial thickness of the plastic in the base portion around and onto said one side of the first portion so that it substantially covers all of said one side of said first portion to aid in securing the rim to the element.

10. The invention of claim 9 and including the step of:

heating the slug to a temperature near the crystalline melt point of the plastic making up the slug prior to the step of forming the highly oriented member.

11. A method of forming a tubular element for use as a shell casing comprising, heating the slug, maintaining the slug at a temperature near but below the crystalline melt point of the plastic making up the slug while, forming a slug of unoriented plastic having a body, a plug depending a predetermined distance from the body, and an opening extending through the body and plug, placing an annular metal rim having an annular first portion with a first outside diameter and an outwardly extending flange with a second outside diameter greater than said first outside diameter on one side of the first portion about the plug so that said one side is away from the body of the slug, forming from the slug body a highly oriented generally cylindrical plastic member having a base portion by the compression of the slug, forcing the plastic in the base portion around the first rim portion to essentially surround said first rim portion, maintaining the outside diameter of the cylindrical member greater than said first outside diameter, but less than said second outside diameter, whereby the sidewall of the cylindrical member is comprised of plastic extending to said rim and the outwardly extending flange comprises said rim, maintaining the size of the opening essentially constant during the compression of the slug.

References Cited

UNITED STATES PATENTS

| | | | |
|---|---|---|---|
| 1,187,464 | 4/1916 | Offutt | 102—44 |
| 3,164,090 | 1/1965 | Williams et al. | 102—43 |
| 3,242,789 | 3/1966 | Woodring | 102—43 X |

FOREIGN PATENTS

| | | |
|---|---|---|
| 1,093,151 | 11/1954 | France. |

ROBERT F. STAHL, Primary Examiner

U.S. Cl. X.R.

102—44